(12) United States Patent
Younse

(10) Patent No.: US 10,569,939 B1
(45) Date of Patent: Feb. 25, 2020

(54) AXIALLY SEALING PLUG

(71) Applicant: United States of America as Represented by the Administrator of NASA, Washington, DC (US)

(72) Inventor: Paulo J. Younse, Pasadena, CA (US)

(73) Assignee: United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 418 days.

(21) Appl. No.: 15/075,542

(22) Filed: Mar. 21, 2016

(51) Int. Cl.
  *B65D 45/30* (2006.01)
  *B65D 53/02* (2006.01)
  *F16L 55/11* (2006.01)

(52) U.S. Cl.
  CPC ............ *B65D 45/30* (2013.01); *B65D 53/02* (2013.01); *F16L 55/11* (2013.01)

(58) Field of Classification Search
  CPC ......... B65D 39/12; B65D 45/30; B65D 39/00
  USPC ................................. 220/319, 789, 804, 801
  See application file for complete search history.

(56) References Cited

U.S. PATENT DOCUMENTS

| | | | | |
|---|---|---|---|---|
| 2,616,582 A | * | 11/1952 | Kappes | B65D 39/12 215/360 |
| 2,716,584 A | | 8/1955 | Retzer | |
| 3,119,177 A | | 1/1964 | Knecht | |
| 3,828,968 A | * | 8/1974 | Kask | B65D 39/12 138/89 |
| 3,983,904 A | | 10/1976 | Laviano | |
| 4,252,457 A | | 2/1981 | Benson et al. | |
| 4,945,951 A | * | 8/1990 | Beamer | B65D 39/00 138/89 |
| 5,295,599 A | | 3/1994 | Smith | |
| 6,450,550 B1 | | 9/2002 | Cornwell | |
| 6,464,266 B1 | | 10/2002 | O'Neill et al. | |
| 2004/0161788 A1 | | 8/2004 | Chen et al. | |
| 2010/0107560 A1 | | 5/2010 | Ehrsam | |
| 2012/0252134 A1 | | 10/2012 | Galiano | |
| 2013/0309147 A1 | | 11/2013 | Yu | |
| 2015/0192230 A1 | | 7/2015 | Jenkins et al. | |

FOREIGN PATENT DOCUMENTS

CA          1249456 A1     1/1989

OTHER PUBLICATIONS

Paulo Younse, "Hermetic Seal Designs for Sample Return Sample Tubes," NASA Tech Briefs, http://ntrs.nasa.gov/archive/nasa/casi.ntrs.nasa.gov/20130014522.pdf (Dec. 2013; last accessed Mar. 9, 2016).
Paulo Youse et al., "Sample Tube Sealing for Future Proposed Mars Sample Return Missions," http://www.lpi.usra.edu/meetings/lpsc2013/pdf/1198.pdf (last accessed Mar. 9, 2016).

* cited by examiner

*Primary Examiner* — Jeffrey R Allen

(57) ABSTRACT

An axially sealing plug may not require modification of a hole being sealed in a tube or pipe. The plug may only require an axial load for activation (not torque), work independently of temperature, require no explosives, and be lightweight and compact. The plug may include a housing or a seal cup that includes at least one tooth on an outer surface and a ramp on an inner surface. The plug may also include a ferrule including a beveled, curved, or chamfered lower end. The ferrule is configured to be inserted inside the housing or seal cup.

14 Claims, 18 Drawing Sheets

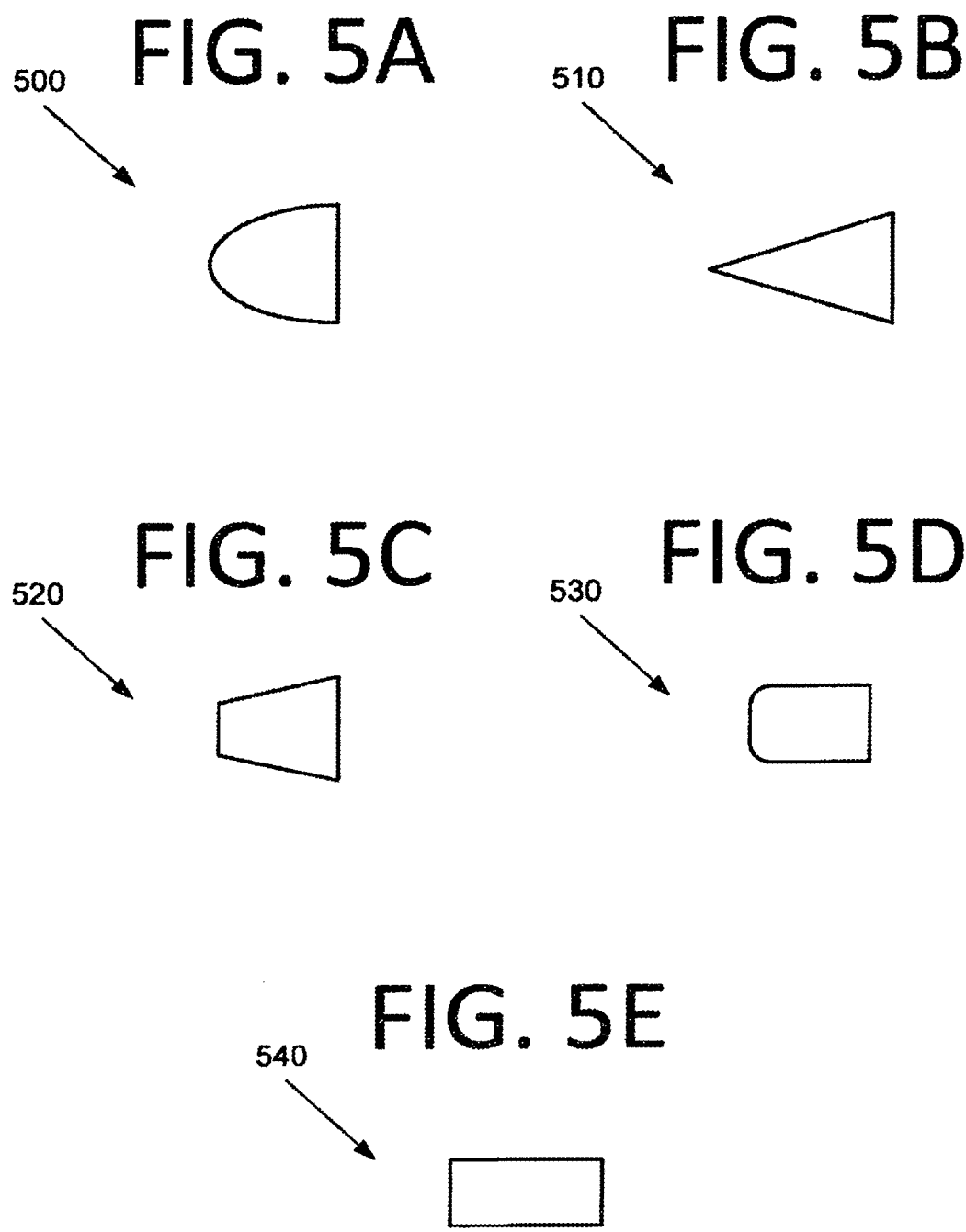

AXIALLY SEALING PLUG

ORIGIN OF THE INVENTION

Embodiments of the present invention described herein were made in the performance of work under NASA contract NNN12AA01C and are subject to the provisions of Public Law #96-517 (35 U.S.C. § 202) in which the Contractor has elected not to retain title.

FIELD

The present invention generally pertains to plugs, and more particularly, to axially sealing plugs that may create a hermetic seal with a sample tube to preserve samples.

BACKGROUND

Hermetically sealing samples may present a challenge in remote or hostile environments, such as the moon, Mars, an irradiated environment, a high temperature/pressure environment, etc. For instance, for a proposed rover mission to Mars in 2020, NASA wishes to collect, document, and package samples for future collection and return to Earth. However, such samples must be able to be hermetically sealed and left on Mars for an extended period of time (e.g., at least five Mars years) without loss of scientific value. In other words, the scientific integrity of the samples must be preserved during the interval between collection and subsequent analysis through effective sealing of the samples. This is needed to prevent loss of water or OH-bearing samples, and also to prevent hydration of anhydrous samples. The Mars 2020 mission proposes to store samples in individually sealed thin-wall sample tubes. The sealing method is desired to be compatible with a smooth thin-wall tube and robust to variations in tube diameter, surface roughness, dust, temperature, vibration, and shock.

Current all-metal radially expanding plugs for hermetic sealing require reaming out of the hole to seat the plug prior to installation, a torque actuator to initiate expansion, thermal control for thermally activation, explosives for explosive welding, or long tapped rod assemblies that add increased mass and storage volume. Accordingly, an alternative plug design may be beneficial.

SUMMARY

Certain embodiments of the present invention may be implemented and provide solutions to the problems and needs in the art that are outside the capabilities of conventional sealing technologies. For instance, some embodiments pertain to an axially sealing plug that does not require modification of the hole being sealed, does not require a torque actuation (just axial load), works independent of temperature, requires no explosives, and is lightweight and compact.

In one embodiment, an apparatus includes a housing or a seal cup including at least one tooth on an outer surface and a ramp on an inner surface. The apparatus also includes a ferrule including a beveled, curved, or chamfered lower end. The ferrule is configured to be inserted inside the housing or seal cup. When the housing or seal cup is inserted into an end of a tube or pipe and the ferrule is activated by applying a force to a top of the ferrule to drive the ferrule further down into the housing or seal cup, the beveled or curved end of the ferrule applies a force to the ramp of the housing or seal cup and forces the at least one tooth outward into an inner wall of the tube or pipe, forming a hermetic seal within the tube or pipe.

In another embodiment, a plug includes a seal cup including at least one tooth on an exterior surface of the seal cup and a ramp on an interior surface of the seal cup. The plug also includes a ferrule including a beveled, curved, or chamfered end. The ferrule is configured to fit within an interior of the seal cup above the ramp prior to activation. When activated, the ferrule moves downward into the seal cup, contacting the ramp and exerting an axial force thereon, pushing the at least one tooth in a substantially outward direction.

In yet another embodiment, an axially sealing plug includes a housing including at least one tooth around an outer diameter of the housing and a ramp on an inner diameter of the housing. The axially sealing plug also includes a ferrule having a rounded, beveled, or chamfered end. The ferrule is configured to be placed within the housing.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIGS. 5A-E illustrate teeth with arc, triangle, trapezoid, beveled rectangle, and rectangle shapes, respectively, according to an embodiment of the present invention.

DETAILED DESCRIPTION OF THE EMBODIMENTS

Some embodiments of the present invention pertain to a plug that can be inserted into an open end of a sample tube, pipe, or any other suitable opening, and be activated with a short axial load onto a center ferrule in a plug housing to radially expand a tooth. This creates a hermetic seal along the inner surface of the tube. The axial plug may include a housing, a ferrule, and a retaining ring. However, in some embodiments, no retaining ring is used.

The housing may have a tooth around its outer diameter, which expands into the inner wall of the tube to create a hermetic seal. The housing may also have a ramp on the inner diameter that directs an axial seal activation load from the ferrule into a radial sealing force at the tooth. The housing may further include a lip that sits on the top of the tube to hold the plug in place and react the axial force on the plug during activation. The ferrule may have a chamfered edge that acts as a wedge against the ramp of the housing to expand the housing at the tooth location when loaded axially into the housing. The retaining ring at the top of the housing (if present) may retain the ferrule in the housing after assembly.

The plug of some embodiments may be used to hermetically seal sample tubes filled with solid, liquid, or gas samples that may contain hazardous chemicals, radioactive materials, or biohazards that require an environmentally robust, reliable, non-degradable, long-lasting, and highly hermetic seals function. Such seals may be used to hermetically close off fluid lines, such as those used in the oil and gas, Heating, Ventilation, and Air Conditioning (HVAC), and power industries (e.g., plugging off damaged heat exchanger lines). As such, some embodiments may have terrestrial applications in addition to or in lieu of extraterrestrial applications.

Figure 1A:
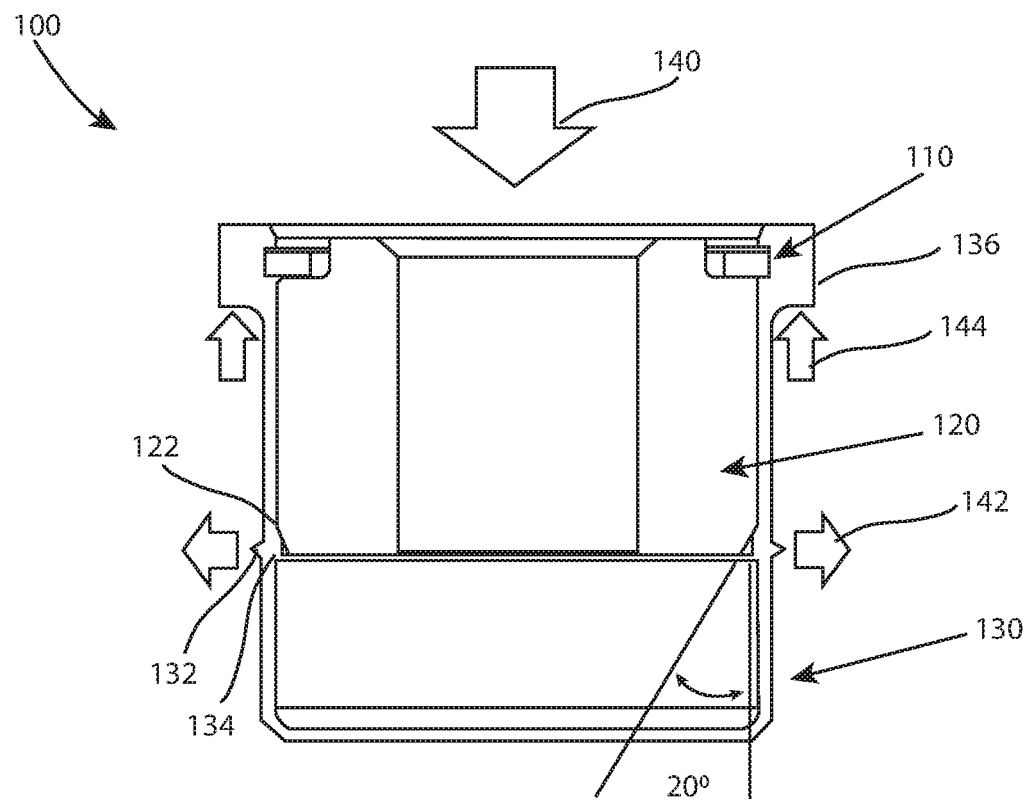
FIG. 1A is side cutaway view illustrating an axially sealing plug, according to an embodiment of the present invention.
Figure 1B:
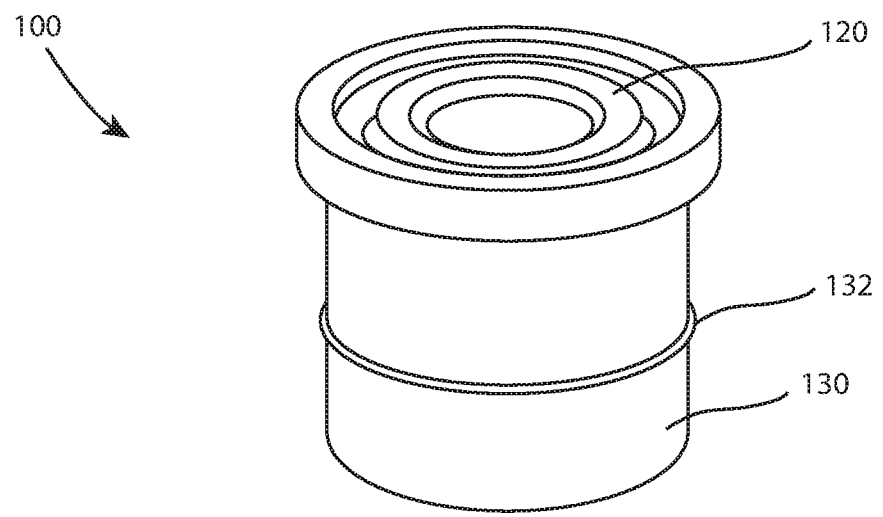
FIG. 1B is an upper perspective view illustrating the axially sealing plug, according to an embodiment of the present invention.
Figure 1C:
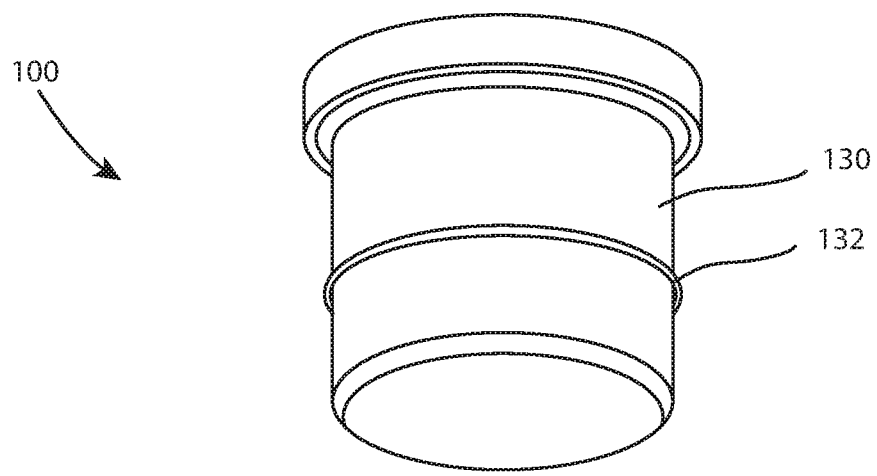
FIG. 1C is a lower perspective view illustrating the axially sealing plug, according to an embodiment of the present invention.

FIGS. 1A-C illustrate an axially sealing plug 100, according to an embodiment of the present invention. Plug 100 includes a retaining ring 110, a ferule 120, and a housing 130. Housing 130 includes a "tooth" 132 around its outer diameter that comes to a point, or is otherwise tapered, to more readily expand into and engage with an inner wall of a sample tube, such as sample tube 150 of FIGS. 1D and 1E, to create a hermetic seal. Housing 130 also includes a ramp 134 on the inner diameter thereof.

Housing 130 further includes a lip 136 that sits on the top of the sample tube to hold plug 100 in place. During activation, when a linear actuator (not shown) is inserted 140 into ferrule 120, an axial force 142 is exerted on plug 100. Lip 136 and reacts 142 axial force 142 on plug 100 during activation. Ferrule 120 has a chamfered edge 122 in this embodiment that acts as a wedge against ramp 134 of housing 130 to expand housing 130 at the location of tooth 132 when chamfered edge 122 is loaded axially into housing 130. In this embodiment, chamfered edge has an angle of 20°. However, any suitable angle may be used without deviating from the scope of the invention. Furthermore, edge 122 need not be chamfered in some embodiments, or may have a corresponding shape to better engage with ramp 134. For instance, edge 122 may be smoothed rather than chamfered in some embodiments. Retaining ring 110 at the top of housing 130 retains ferrule 120 in housing 130 after assembly.

Figure 1D:
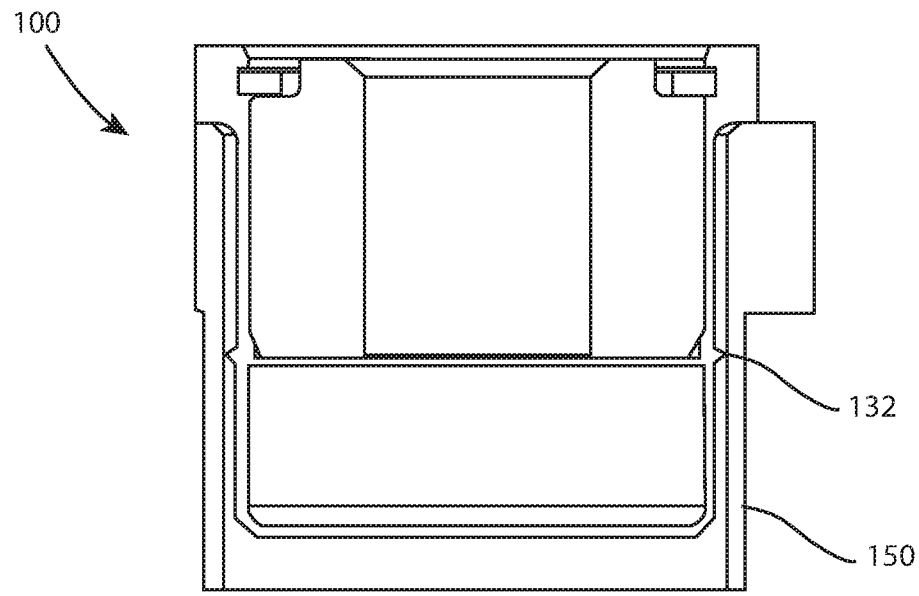
FIG. 1D is a side cutaway view illustrating the axially sealing plug in a sample tube prior to sealing, according to an embodiment of the present invention.
Figure 1E:
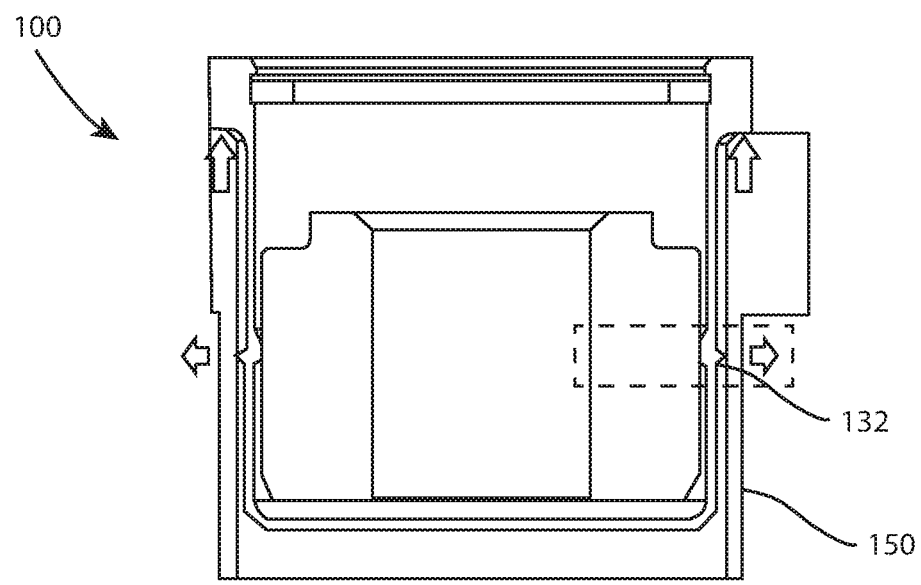
FIG. 1E is a side cutaway view illustrating the axially sealing plug in the sample tube after sealing, according to an embodiment of the present invention.

FIGS. 1D and 1E illustrate axially sealing plug 100 in sample tube 150 before and after sealing, respectively, according to an embodiment of the present invention. Prior to sealing, tooth 132 fits within the inner circumference of sample tube 150. See FIG. 1D. Once actuated, tooth 132 actually slightly digs into the inner wall of sample tube 150 in this embodiment. See FIG. 1E. This prevents small scratches and ridges in the inner wall of sample tube 150 from allowing a leak. Tooth 132 bites in through this "rough" surface and also cuts through any dust or other material. Generally speaking, the smaller and sharper the tooth, the better. However, in some embodiments, the tooth may have a flat or rounded edge.

Figure 2A:
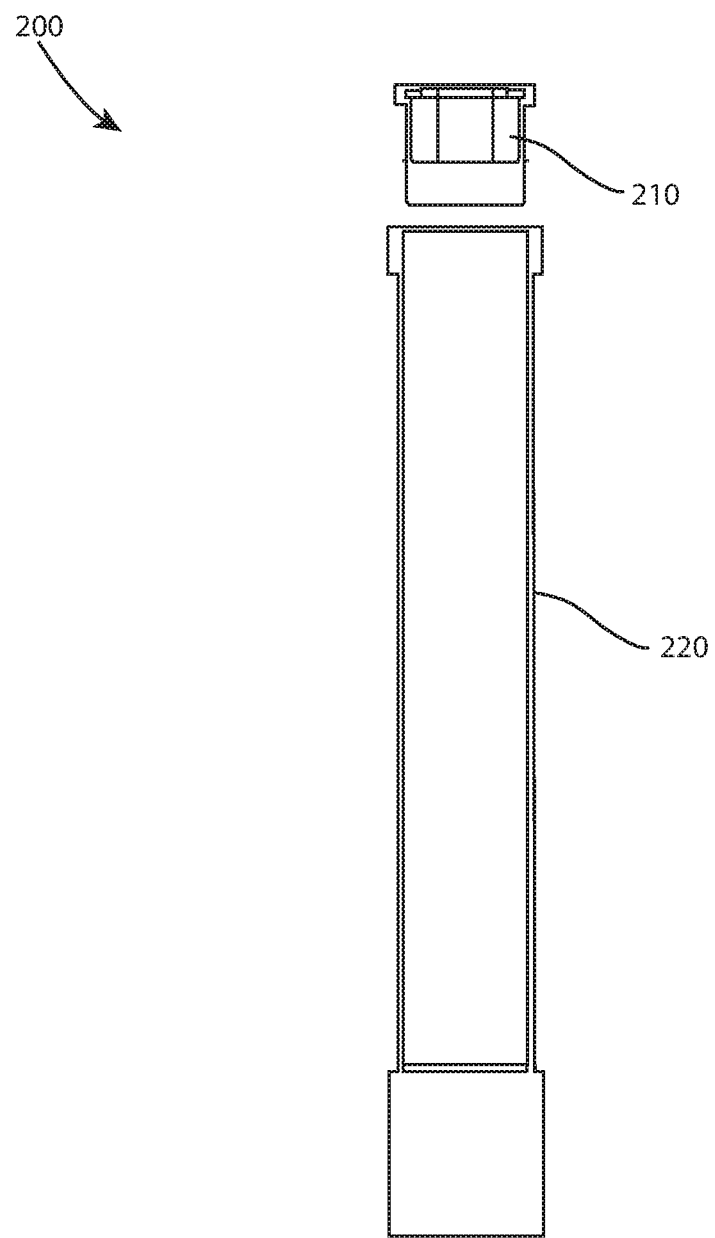
FIG. 2A is a side cutaway view illustrating an axially sealing plug and an empty sample tube prior to sampling and assembly, according to an embodiment of the present invention.
Figure 2B:
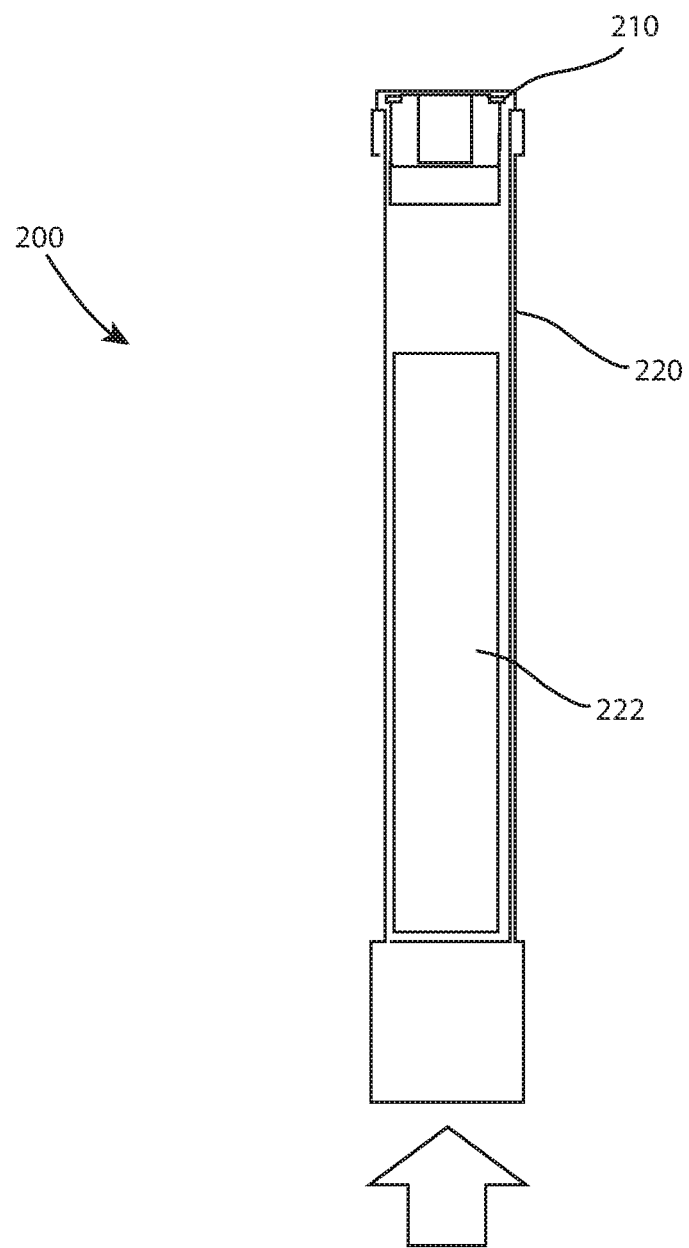
FIG. 2B is a side cutaway view illustrating an axially sealing plug and a filled sample tube after the plug has been inserted, but prior to activation, according to an embodiment of the present invention.

FIGS. 2A-D illustrate a sample tube and plug assembly 200 at various stages of assembly, according to an embodiment of the present invention. In FIG. 2A, an axially sealing plug 210 and an empty sample tube 220 are shown prior to sampling and assembly. In FIG. 2B, plug 210 and filled sample tube 220 are shown after a sample 222 has been collected and plug 210 has been inserted. In this embodiment, sampling tube 220 is pressed up into plug 210 after sampling, but the opposite may be performed in some embodiments without deviating from the scope of the invention.

Figure 2C:
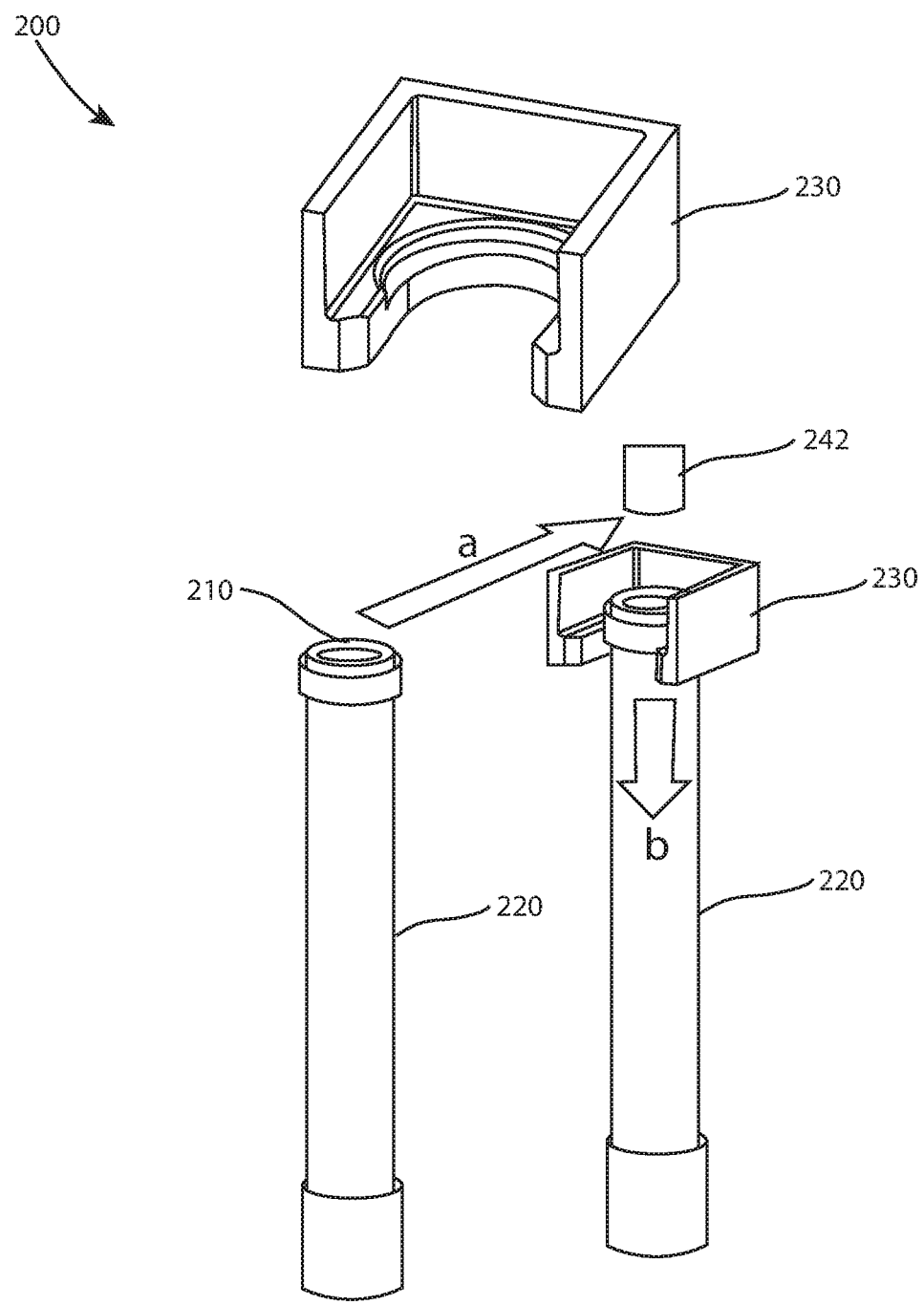
FIG. 2C a perspective view illustrating a filled sample tube with an inserted plug and a backing die affixed, but prior to activation, according to an embodiment of the present invention.

In FIG. 2C, filled sample tube 220 is shown with plug 210 inserted and a backing die 230 affixed to sample tube 220 before activation. In FIG. 2C, backing 230 is shown separately as well to more clearly illustrate its design in this embodiment. Backing die is affixed to a structure, such as a rover, to constrain sample tube 220 and react an axial load during sealing.

Sample tube 220 is transferred to a sealing station, and is moved towards backing die 230 via horizontal motion in direction "a". Sample tube 220 is then seated into backing die 230 via vertical motion in direction "b". A tip 242 of a linear actuator 240 is shown in FIG. 2C prior to actuation.

Figure 2D:
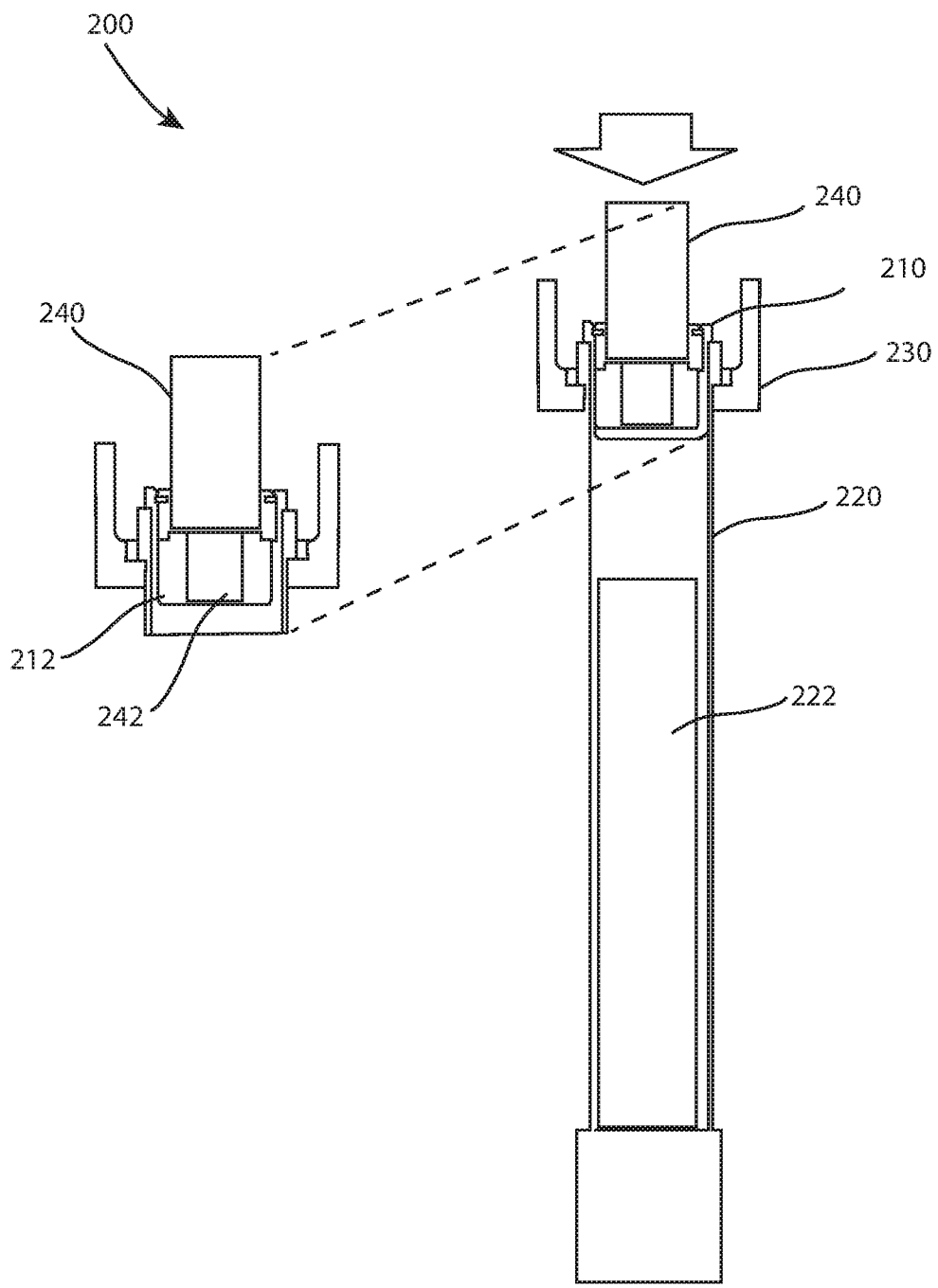
FIG. 2D is a side cutaway view illustrating a filled sample tube with an inserted plug and linear actuator during activation, according to an embodiment of the present invention.

In FIG. 2D, tip 242 if linear actuator 240 is inserted into a ferrule 212 of plug 210 in the direction shown by the arrow. This expands ferrule 212, pressing on a housing of plug 210 and forcing a tooth thereof against an inner wall of sample tube 220 in a manner similar to that shown in FIGS. 1D and 1E. The top of the combined plug assembly 200 is shown separately to more clearly show the locations of tip 242 and ferrule 212.

Figure 3A:
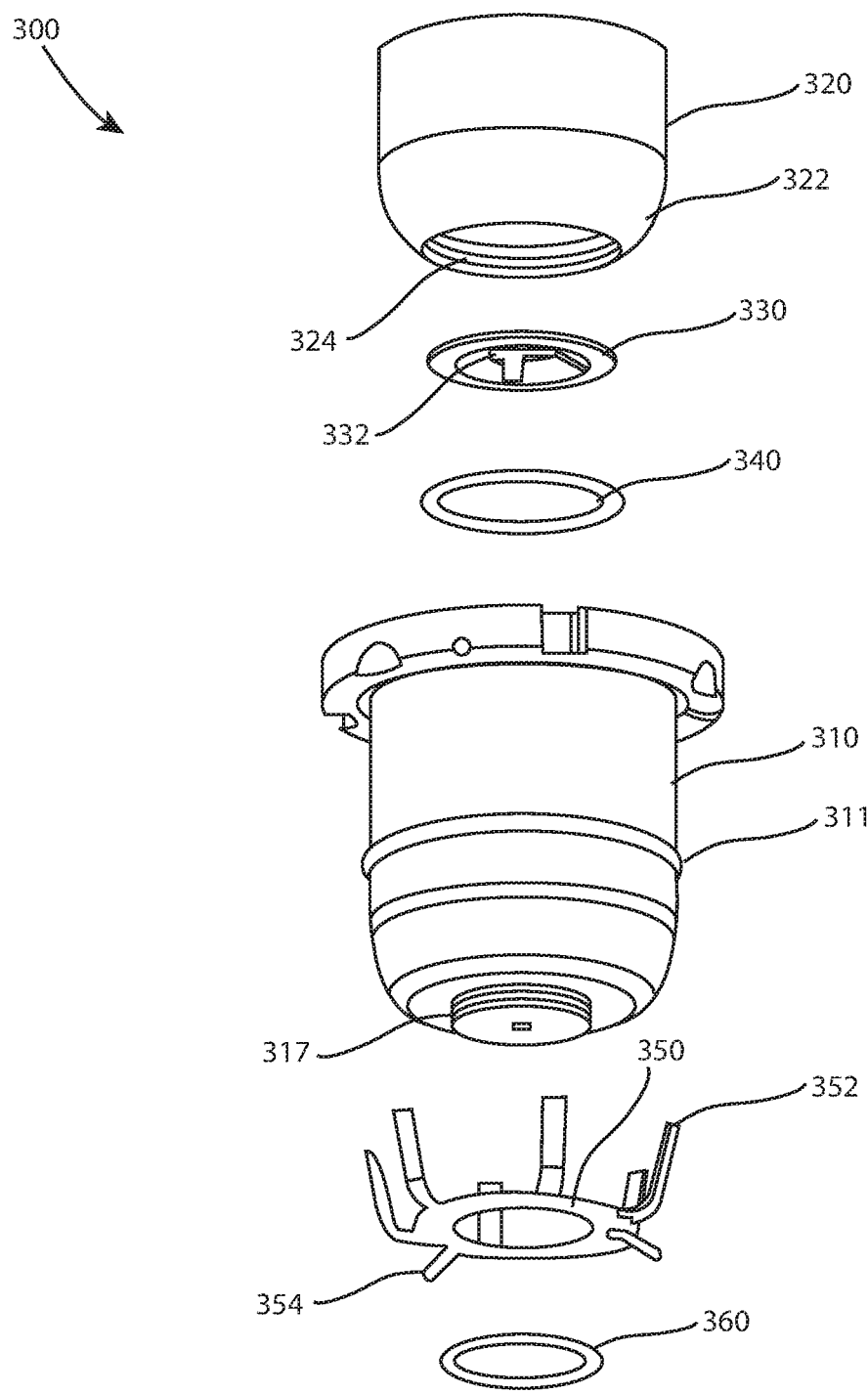
FIG. 3A is an exploded view illustrating individual components of an axially sealing plug, according to an embodiment of the present invention.

FIGS. 3A-H show a more advanced plug design. In FIG. 3A, an exploded view of individual components of an axially sealing plug 300 are shown. Plug 300 includes a seal cup 310, a ferrule 320, a push-on fastener 330 such as the Starlock® fastener provided by Baker & Finnemore Ltd. (which is so named due to a star-shaped opening 332 therein), a washer 340, a spider spring 350, and a seal cup retaining ring 360.

To assemble the components of plug 300, washer 340 and then push-on fastener 330 are placed over and around a central stem 316 (see FIG. 3D) of seal cup 310. Central stem 316 is then inserted through an opening 324 in a smooth, curved end 322 at the bottom of ferrule 320 such that ferrule 320 also slides over and covers push-on fastener 330 and washer 340. At this point, ferrule 320, push-on fastener 330, and washer 340 all reside within seal cup 310.

Figure 3B:
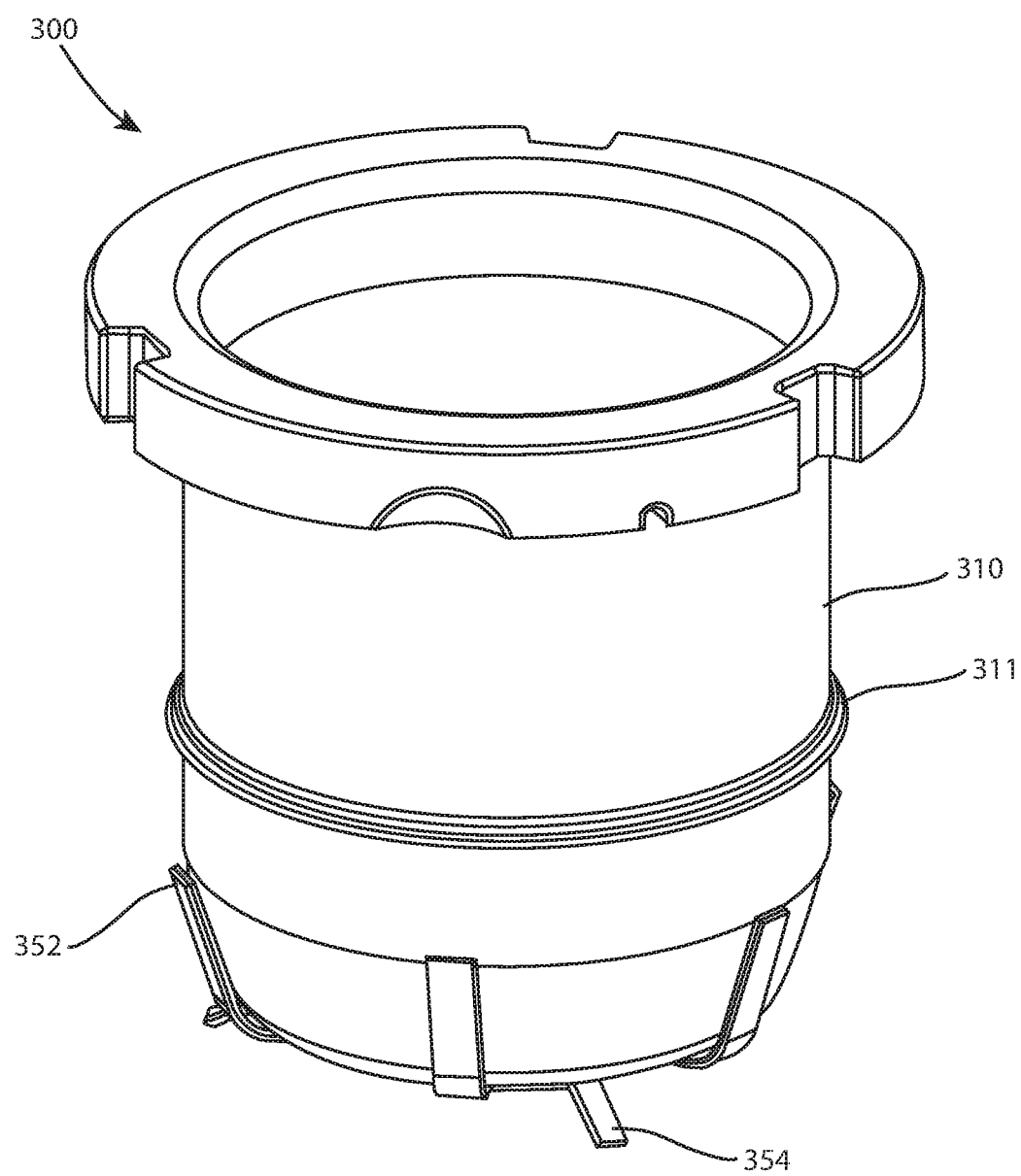
FIG. 3B is an upper perspective view illustrating the axially sealing plug, according to an embodiment of the present invention.
Figure 3C:
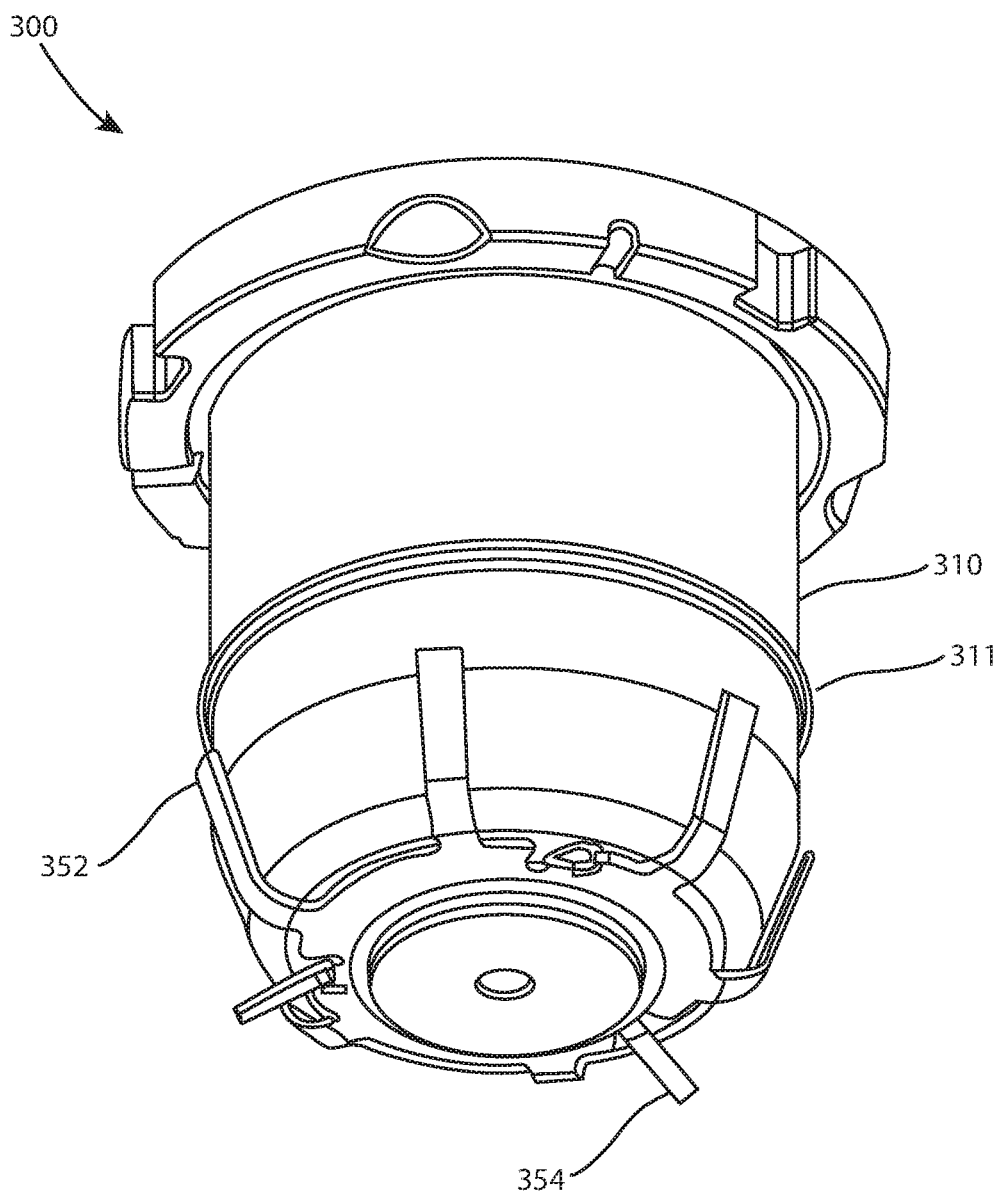
FIG. 3C is a lower perspective view illustrating the axially sealing plug, according to an embodiment of the present invention.

On the lower end of seal cup 310, spider spring 350 is slid over a retaining member 318 of seal cup 310. Spider spring 350 has tube retention spring fingers 352 that extend outwards into the inner wall of a sample tube to hold the seal inside the sample tube when plug 300 is inserted therein. Spider spring 350 also has kickoff spring fingers 354 that provide a separation force on a lower seal cup during dispensing (see nested plugs 300 in FIG. 3H). A seal cup retaining ring 360 is then positioned in a groove of retaining member 318, locking spider spring 350 in place. Upper and lower perspective views of assembled plug 300 are shown in FIGS. 3B and 3C, respectively.

Figure 3D:
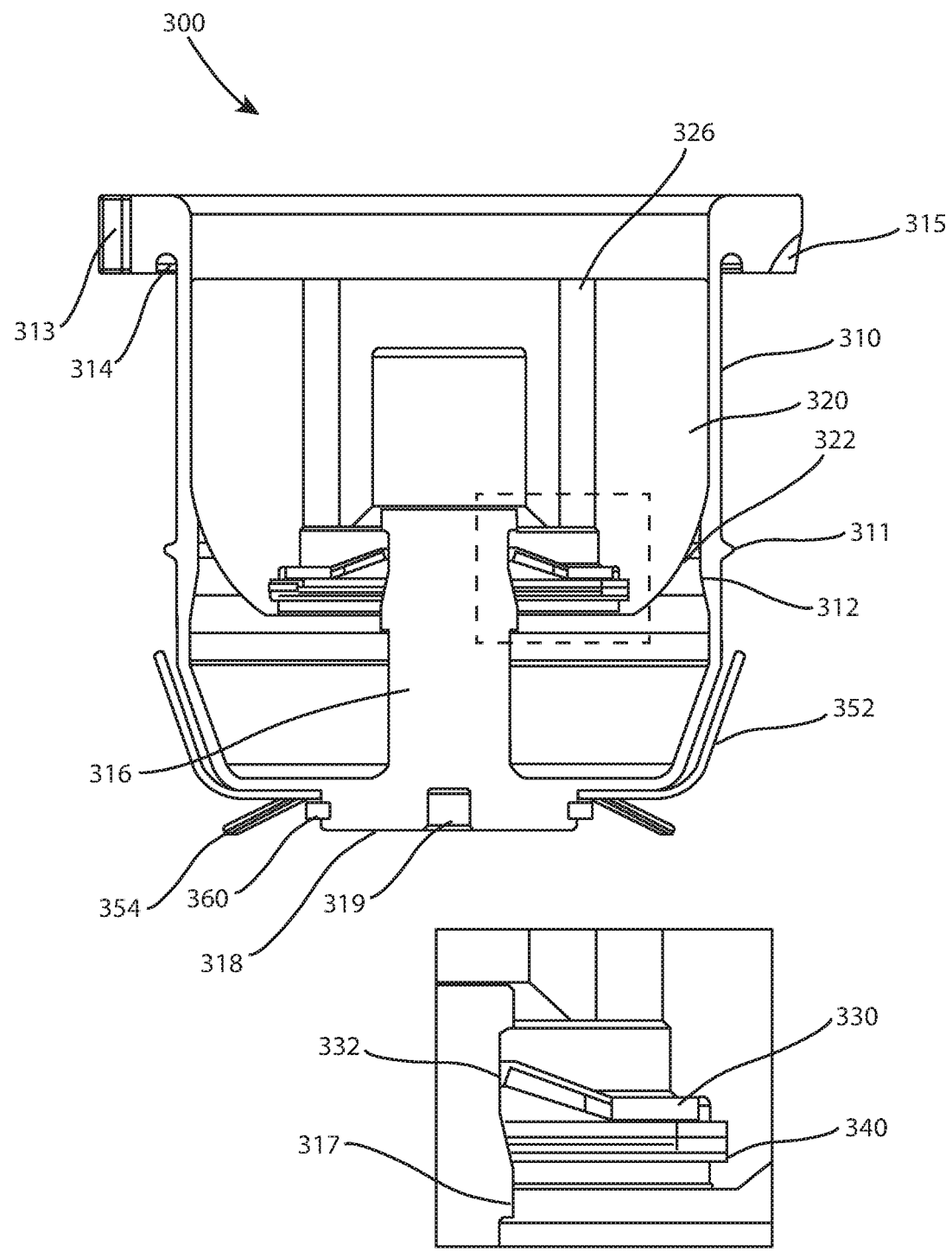
FIG. 3D is side cutaway view illustrating the axially sealing plug before activation, according to an embodiment of the present invention.

FIG. 3D is side cutaway view illustrating plug 300 before activation, according to an embodiment of the present invention. Seal cup 310 has a tooth 311 and a ramp 312 that transmits a vertical load from ferrule 320 into an expansion load of seal cup 310 due to end 322 of ferrule 320 sliding past and exerting force against ramp 312. However, unlike the configuration shown in FIG. 1A, ferrule 320 includes a smooth, curved end 322 rather than a chamfered end 122. Smoothing out end 322 may allow ferrule 320 to slide more easily past ramp 312.

In this embodiment, seal cup 310 includes a rail notch 313, a flow interface 314, and a ball pocket 315. Rail notch 313 enables locking of seal cup 310 in a seal cup dispenser (see FIGS. 4A and 4B). Flow interface 314 moderates the flow rate of gases that could transport contaminants towards the seal region. Ball pocket 315 interfaces with balls in a seal dispenser ball lock (see FIGS. 4A and 4B) to retain seal cup 310 in the seal cup dispenser. Vents 326 in ferrule 320 prevent pressure buildup in confined volume during seal activation. An alignment recess 319 may allow attachment of spider spring and seal cup retaining ring via an assembly tool (not shown).

The expanded image in FIG. 3D shows push-on fastener 330 and washer 340 when they are positioned within seal cup 310 and ferrule 320. When plug 300 is activated, opening 332 of push-on fastener 330 slides over flared member 317 of central stem 316 slides around and past flared member 317.

Figure 3E:
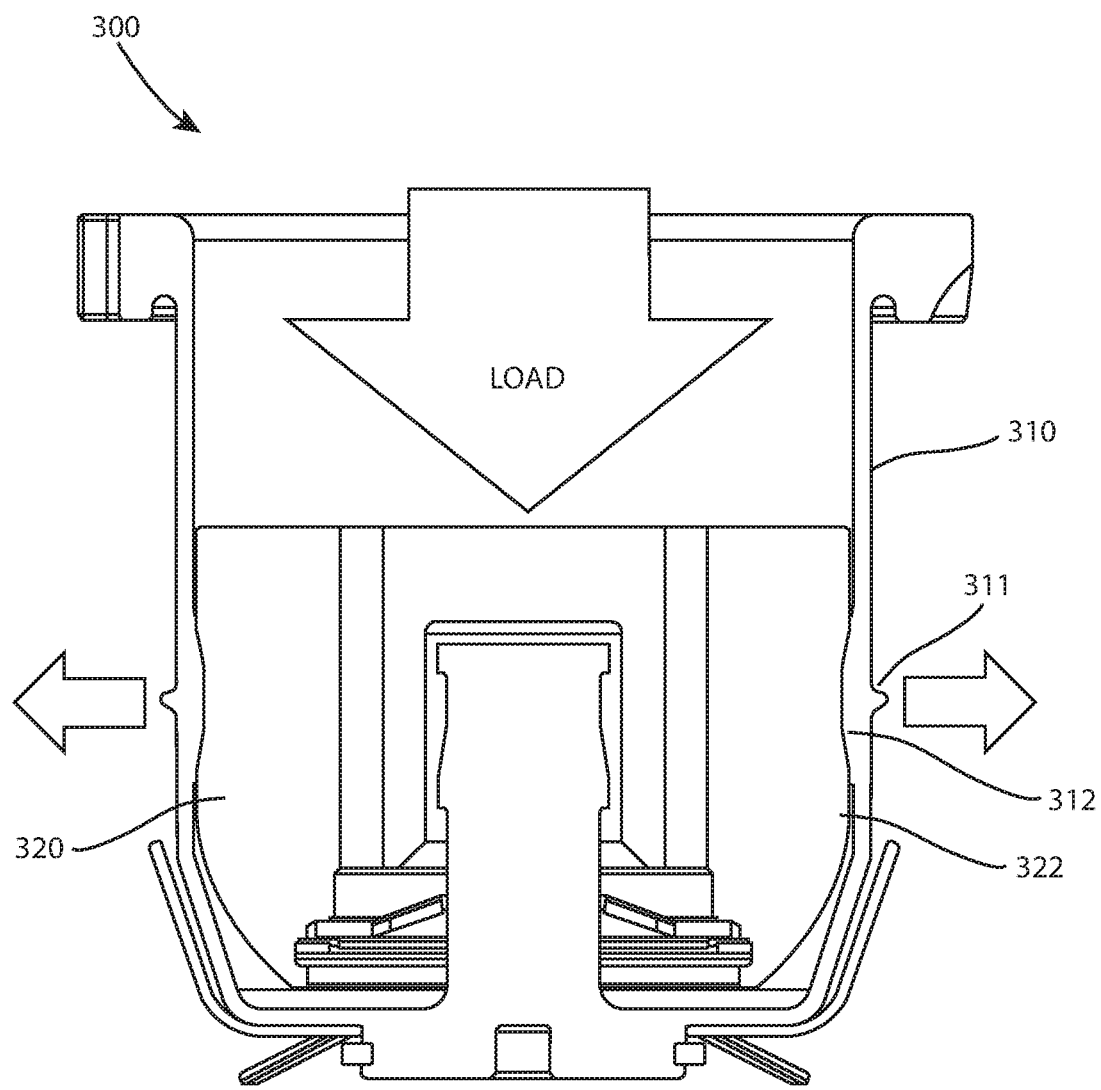
FIG. 3E is side cutaway view illustrating the axially sealing plug after activation, according to an embodiment of the present invention.

FIG. 3E is side cutaway view illustrating plug 300 after activation, according to an embodiment of the present invention. In FIG. 3E, a load applied to the top of ferrule 320 drives ferrule 320 down into seal cup 310, past ramp 312, and into its activated position. The axial force exerted by ferrule 320 on ramp 312 drives tooth 311 outward and into the inner wall of a sample tube (not shown). This establishes a hermetic seal. Note that in this embodiment, a linear actuator (not shown) need not be inserted into ferrule 320. Rather, a force is simply applied to the top of ferrule 320.

Figure 3F:
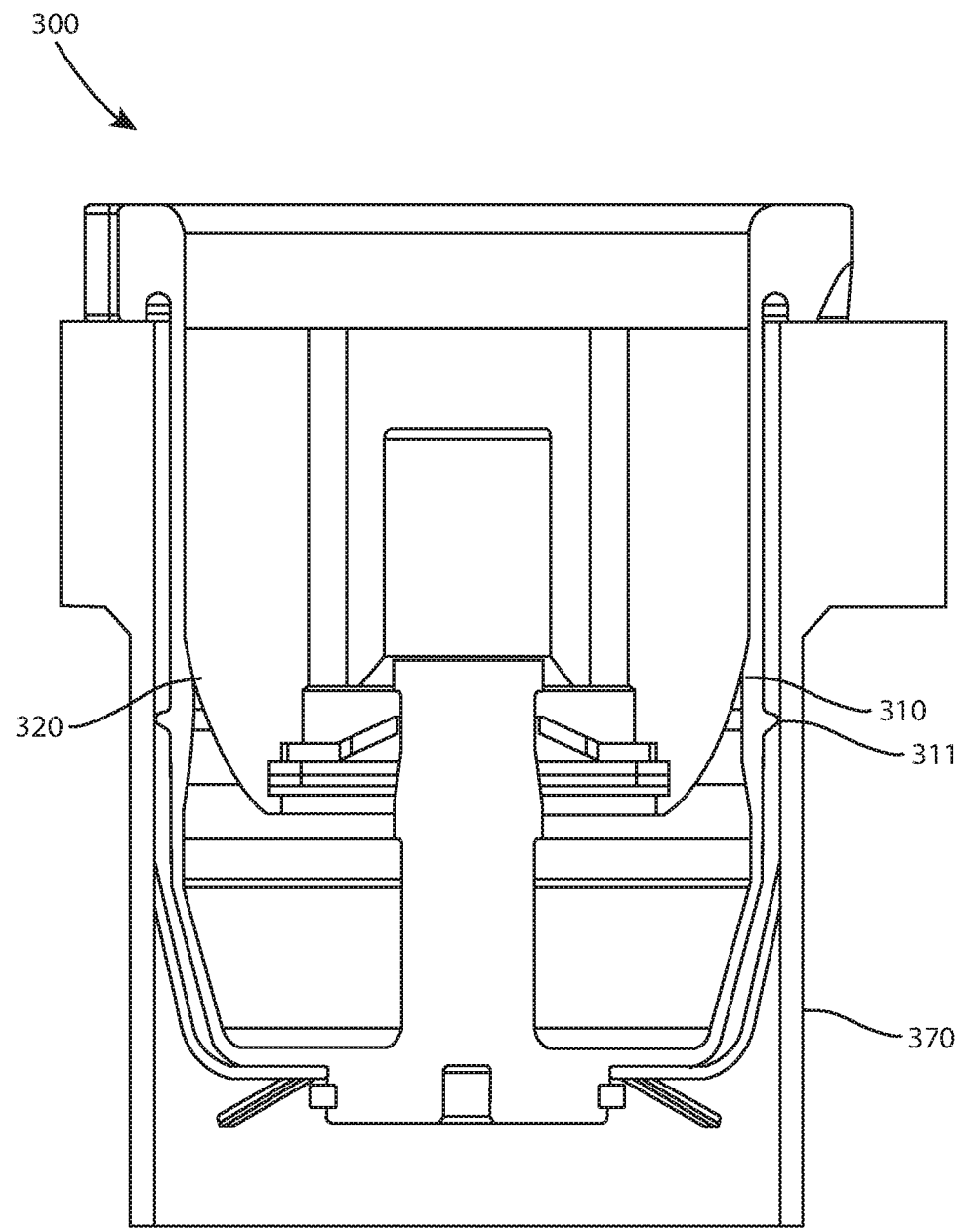
FIG. 3F is a side cutaway view illustrating the axially sealing plug inside of a sample tube before activation, according to an embodiment of the present invention.
Figure 3G:
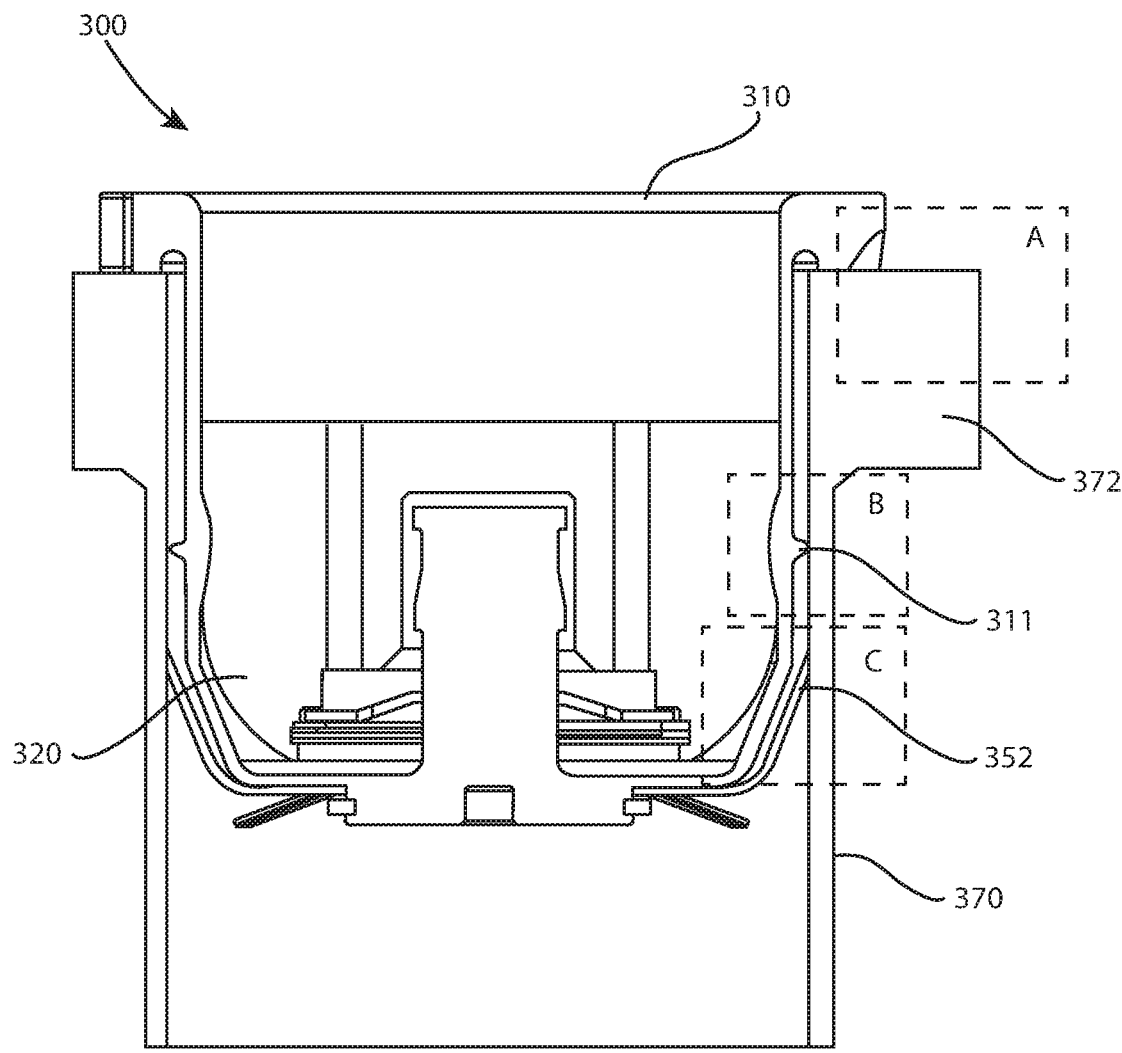
FIG. 3G is a side cutaway view illustrating the axially sealing plug inside of a sample tube after activation, according to an embodiment of the present invention.
Figure 3H:
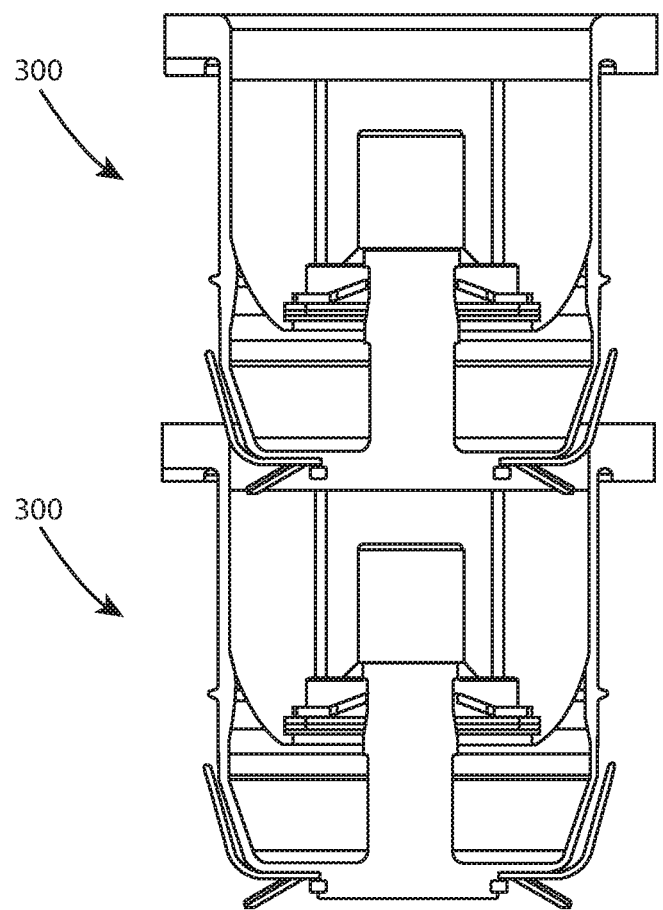
FIG. 3H is a side cutaway view illustrating multiple axially sealing plugs in a nested configuration, according to an embodiment of the present invention.

FIGS. 3F and 3G are side cutaway views illustrating plug 300 inside of a sample tube 370 before and after activation, respectively, according to an embodiment of the present invention. Prior to activation, tooth 311 is positioned adjacent to the inner wall of sample tube 370. After activation, tooth 311 slightly bites into the inner wall of sample tube 370, creating a hermetic seal.

Box A shows the section of FIG. 3G where a lip of seal cup 310 interfaces with a top of a bearing race 372 of sample tube 370. Box B shows the section of FIG. 3G where tooth 311 contacts the inner wall of sample tube 370. Box C shows the section of FIG. 3G where a tube retention spring finger 352 contacts, and provides tension against, the inner wall of sample tube 370.

Figure 4A:
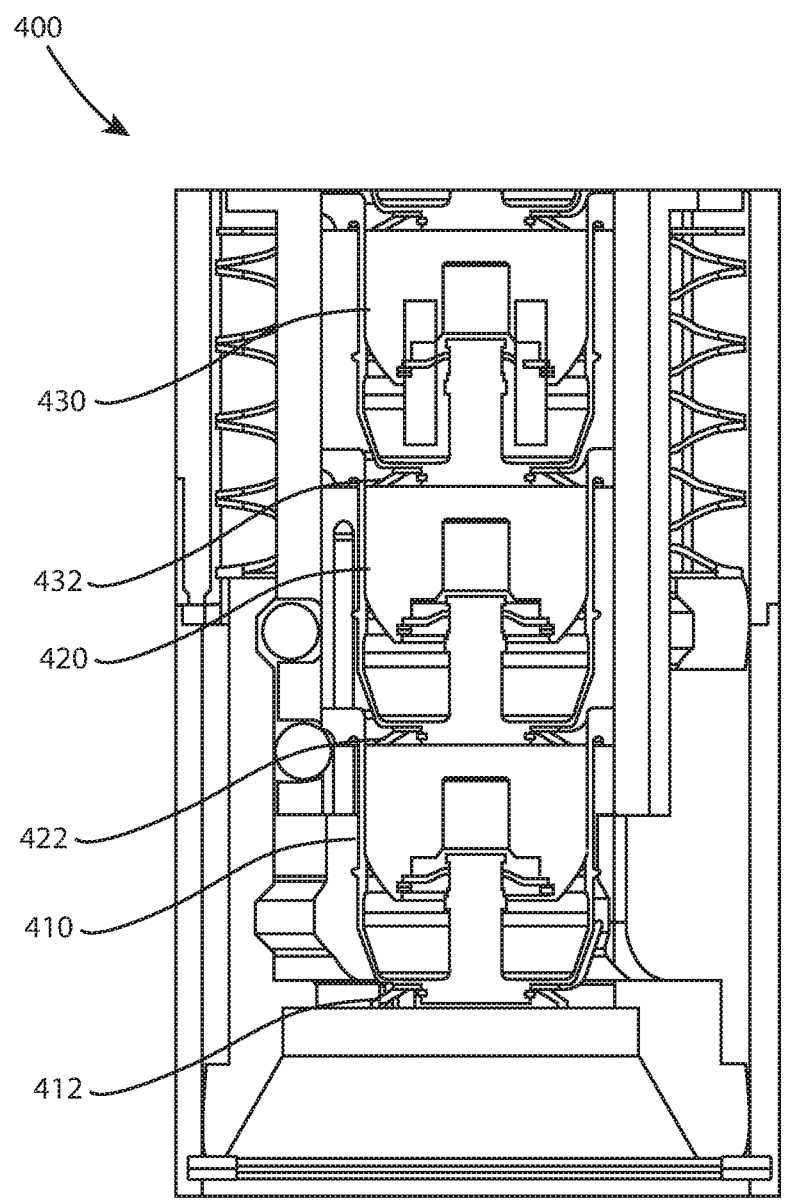
FIG. 4A is a side cutaway view illustrating a seal cup dispenser in a storage configuration, according to an embodiment of the present invention.
Figure 4B:
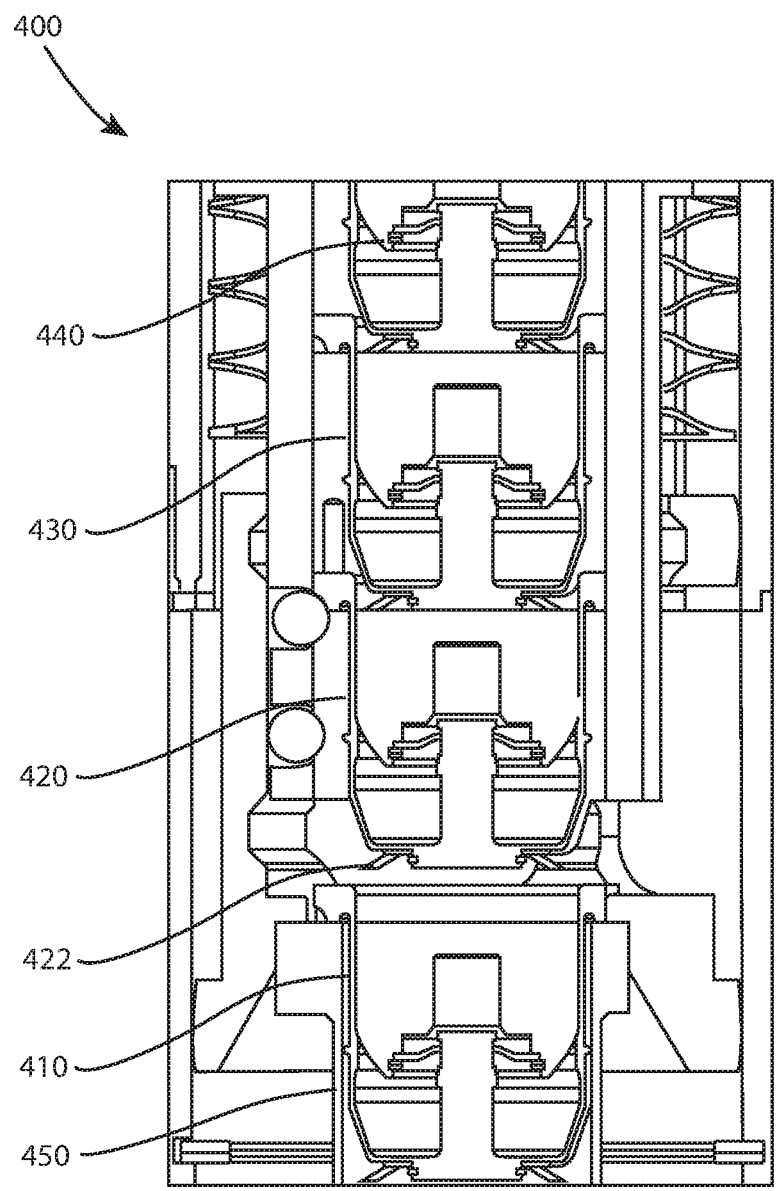
FIG. 4B is a side cutaway view illustrating a seal cup dispenser in a dispensing configuration, according to an embodiment of the present invention.

FIGS. 4A and 4B are side cutaway views illustrating a seal cup dispenser 400 in a storage configuration and a dispensing configuration, respectively. In the storage configuration, plugs 410, 420, 430 are pressed together in place, applying tension to respective kickoff spring fingers 412, 422, 432. However, in the dispensing configuration, the force applied by kickoff spring fingers 422 help to separate plug 410 from the other plugs, and a new plug 440 is forced downward. Plug 410 is placed in an end of sample tube 450, where it can subsequently be activated as described above.

FIGS. 5A-E show some example tooth designs, according to an embodiment of the present invention. These include an arc 500, a triangle 510, a trapezoid 520, a beveled rectangle 530, and a rectangle 540. However, any desired shapes may be used in other embodiments without deviating from the scope of the invention.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus comprising:
a housing or a seal cup comprising at least one tooth on an outer surface, a ramp on an inner surface, and a retaining member having a groove;
a ferrule comprising a beveled, curved, or chamfered lower end, the ferrule configured to be inserted inside the housing or seal cup;
a spider spring comprising a hole, retention spring fingers that extend outwards towards an inner wall of a tube or pipe, and kickoff spring fingers; and
a retaining ring, wherein
the spider spring fits over the retaining member via the hole,
the retaining ring fits into the groove, locking the spider spring in place,
the retention spring fingers help to seal the apparatus with the tube or pipe when inserted therein, and
the kickoff spring fingers provide a separation force on another apparatus when multiple apparatuses are nested; and wherein
when the housing or seal cup is inserted into an end of a tube or pipe and the ferrule is activated by applying a force to a top of the ferrule to drive the ferrule further down into the housing or seal cup, the beveled or curved end of the ferrule applies a force to the ramp of the housing or seal cup and forces the at least one tooth outward to dig into an inner wall of the tube or pipe, deforming the inner wall of the tube or pipe, thereby forming a hermetic seal within the tube or pipe.

2. The apparatus of claim 1, wherein the at least one tooth comes to a point, is tapered, has an arc-shaped end, has a triangle-shaped end, has a trapezoid-shaped end, has a beveled end, is rectangular, or any combination thereof.

3. The apparatus of claim 1, wherein
the apparatus comprises the seal cup,
the seal cup further comprises a stem having a flared member, and
the ferrule is configured to fit over the stem via an opening, to keep the ferrule from backing out of the seal cup, and the ferrule further comprises at least one vent that prevents or mitigates against pressure buildup in a confined volume of the seal cup into which the ferrule is inserted during activation.

4. The apparatus of claim 3, wherein the apparatus comprises the seal cup, the apparatus further comprising:
a push-on fastener comprising an opening; and
a washer, wherein the washer and the push-on fastener fit over the stem below the ferrule and are placed into the seal cup before the ferrule in a position to keep the ferrule from backing out of the seal cup.

5. The apparatus of claim 1, wherein the apparatus comprises the housing, the apparatus further comprising:
a lip that is configured to sit on an opening of a tube or pipe and hold the apparatus in place,
wherein the ferrule comprises a hole through which an end of a linear actuator may be inserted such that when inserted, the end of the linear actuator presses the ferrule down into the housing and forces the ramp and at least one tooth outward via an axial force, and a backing die is affixed to the tube or pipe prior to insertion of the end of the linear actuator.

6. A plug, comprising:
a seal cup comprising a retaining member having a groove, at least one tooth on an exterior surface of the seal cup and a ramp on an interior surface of the seal cup;
a spider spring having a hole; wherein the spider spring fits over the retaining member via the hole;
a retaining ring, wherein the retaining ring fits into the groove, locking the spider spring in place; and
a ferrule comprising a beveled, curved, or chamfered end, the ferrule configured to fit within an interior of the seal cup above the ramp prior to activation, wherein
when activated, the ferrule moves downward into the seal cup, contacting the ramp and exerting an axial force thereon, pushing the at least one tooth in a substantially outward direction.

7. The plug of claim 6, wherein
the seal cup further comprises a stem having a flared member,
the ferrule comprises an opening in the beveled, curved, or chamfered end, and
the ferrule is configured to fit over the stem via the opening.

8. The plug of claim 7, further comprising:
a push-on fastener comprising an opening; and
a washer, wherein
the washer and the push-on fastener fit over the stem below the ferrule and are placed into the seal cup before the ferrule.

9. The plug of claim 6, wherein:
the spider spring further comprises outwardly extending retention spring fingers that extend outwards towards an inner wall of a tube or pipe and help to seal the plug with the tube or pipe when inserted therein.

10. The plug of claim 6, wherein:
the spider spring further comprises kickoff spring fingers that provide a separation force on another plug when the plug is nested with multiple plugs.

11. The plug of claim 6, wherein the ferrule further comprises at least one vent that prevents or mitigates against pressure buildup in a confined volume of the seal cup into which the ferrule is inserted during activation.

12. An axially sealing plug, comprising:
a housing comprising at least one tooth around an outer diameter of the housing and a ramp on an inner diameter of the housing;
a ferrule having a rounded, beveled, or chamfered end, the ferrule configured to be placed within the housing, wherein the ferrule comprises a hole through which an end of a linear actuator may be inserted such that when inserted, the end of the linear actuator presses the ferrule down into the housing and forces the ramp and the at least one tooth outward via an axial force, thereby causing the at least one tooth to dig into an inner wall of a tube or pipe, deforming the inner wall of the tube or pipe, thereby forming a hermetic seal within the tube or pipe;

a spider spring comprising a hole, retention spring fingers that extend outwards towards an inner wall of a tube or pipe, and kickoff spring fingers; and a retaining ring, wherein the spider spring fits over the retaining member via the hole, the retaining ring fits into the groove, locking the spider spring in place, and the retention spring fingers help to seal the apparatus with the tube or pipe when inserted therein.

13. The axially sealing plug of claim 12, wherein the at least one tooth comes to a point, is tapered, has an arc-shaped end, has a triangle-shaped end, has a trapezoid-shaped end, has beveled end, is rectangular, or any combination thereof.

14. The axially sealing plug of claim 12, wherein the housing further comprises:

a lip that is configured to sit on an opening of the tube or pipe and hold the axially sealing plug in place.

* * * * *